US012753853B1

(12) United States Patent
Hu et al.

(10) Patent No.: US 12,753,853 B1
(45) Date of Patent: Oct. 6, 2026

(54) ANTI-SCALD VALVE

(71) Applicant: CLEMENT INC., Flushing, NY (US)

(72) Inventors: Yunan Hu, Ganzhou (CN); Xingfa Liao, Xiamen (CN); Chunhua Wang, Xiamen (CN); Yongqiang Yan, Fuzhou (CN)

(73) Assignee: CLEMENT INC., Flushing, NY (US)

( * ) Notice: Subject to any disclaimer, the term of this patent is extended or adjusted under 35 U.S.C. 154(b) by 0 days.

(21) Appl. No.: 19/202,980

(22) Filed: May 8, 2025

(51) Int. Cl.
*F16K 31/00* (2006.01)
*F16K 3/24* (2006.01)

(52) U.S. Cl.
CPC .............. *F16K 31/002* (2013.01); *F16K 3/24* (2013.01)

(58) Field of Classification Search
CPC ................................. F16K 31/002; F16K 3/24
USPC ............................................................ 251/11
See application file for complete search history.

(56) References Cited

U.S. PATENT DOCUMENTS 4,883,082 A * 11/1989 Pirkle ...................... E03B 7/10 251/74
5,141,153 A * 8/1992 Jeffress ............. G05D 23/1353 236/93 B
5,560,541 A * 10/1996 Warshawsky ........ G05D 23/134 137/457
5,647,530 A * 7/1997 Lorch ................ G05D 23/1353 236/93 B
6,371,437 B1 * 4/2002 Kenny ...................... F16T 1/02 251/11
7,407,113 B2 * 8/2008 Guterman ............ F16K 31/002 137/62
2011/0168927 A1 * 7/2011 Yuan .................... F16K 11/044 251/11

* cited by examiner

*Primary Examiner* — John Bastianelli

(57) ABSTRACT

An anti-scald valve including a valve body, a sliding seat, a sliding spool, and a thermal conductive element, a first biasing member and a second biasing member. Second biasing member is movably disposed within valve body. When high-temperature water supply is required, second biasing member is able to separate from a deformable element under external force, thereby removing the counter force applied on the thermal conductive element by the second biasing member. This allows first biasing member to drive sliding spool to slide to an initial position where a sealing end is separated from an abutment end, thereby opening the inlet passageway for high-temperature water. The present application not only retains the anti-scalding function of conventional thermal safety valves, but also enables forced opening of the water inlet passageway by moving the second biasing member when high-temperature water supply is required.

13 Claims, 10 Drawing Sheets

ANTI-SCALD VALVE

TECHNICAL FIELD

Disclosed is a valve-related technical solution, which is especially directed to an anti-scald valve.

BACKGROUND

An anti-scald valve, being a water temperature control valve configured to instantaneously terminate water outflow when the outlet temperature exceeds a predetermined threshold (e.g., above 49° C.), thereby preventing body scalding, and to automatically resume water supply in response to the temperature decreasing to a designated safe level.

When in use, the anti-scald valve restricts water temperature below 49° C., yet fails to accommodate scenarios requiring hot water supply such as high-temperature disinfection of tableware, which compromises practicality.

Accordingly, the present disclosure provides an anti-scald valve specifically designed to address one or more of the aforementioned issues.

SUMMARY

The present disclosure provides an anti-scald valve which can effectively solve the aforementioned problems.

The invention is implemented by the following solutions.

An anti-scald valve, comprising: a valve body having a water inlet end and a water outlet end both communicating with an interior of the valve body;

- a sliding seat disposed in the interior of the valve body, wherein the sliding seat has an abutment end;
- a sliding spool slidably mounted in the sliding seat, wherein the sliding spool has a sealing end, when the sealing end is separated from the abutment end, a water inlet passageway is defined between the sealing end and the abutment end, and when the sealing end contacts the abutment end, the water inlet passageway is closed;
- a thermal conductive element, wherein an end of the thermal conductive element is fixedly connected to the sliding spool, and the thermal conductive element has a deformable element that is thermally expandable;
- a first biasing member configured to apply a thrust force to the thermal conductive element at low temperatures, thereby driving the sliding spool to slide to an initial position where the sealing end is separated from the abutment end, so as to open the water inlet passageway;
- a second biasing member disposed in the valve body, wherein when high-temperature water flows into the valve body, heat transferred from the thermal conductive element to the deformable element, causing thermal expansion of the deformable element, thus coupling with an end of the second biasing member; the coupling enables the second biasing member to exert a counterforce on the thermal conductive element and the counterforce overcomes the thrust force of the first biasing member, thereby driving the sliding spool to slide to a position where the sealing end contacts the abutment end, so as to close the water inlet passageway;

wherein, when high-temperature water supply is required, the second biasing member is separable from a coupling end of the deformable element under external force application, allowing the first biasing member to drive the sliding spool to slide to the initial position where the sealing end is separated from the abutment end, so as to open the water inlet passageway for high-temperature water intake.

The present disclosure has the following advantages.

The present application not only retains the anti-scalding function of conventional thermal safety valves, but also enables forced opening of the water inlet passageway by applying external force to move the second biasing member away from the coupling end when high-temperature water supply is required, thereby allowing high-temperature water to flow into the valve body for use.

BRIEF DESCRIPTION OF THE DRAWINGS

To more clearly illustrate the technical solutions of the embodiments of the present disclosure, the following provides a brief introduction to the accompanying drawings required for describing the embodiments. It should be understood that these drawings merely depict certain embodiments of the present disclosure and therefore shall not be construed as limiting the scope. For those skilled in the art, other related drawings may be derived from these illustrations without creative efforts.

Figure 1:
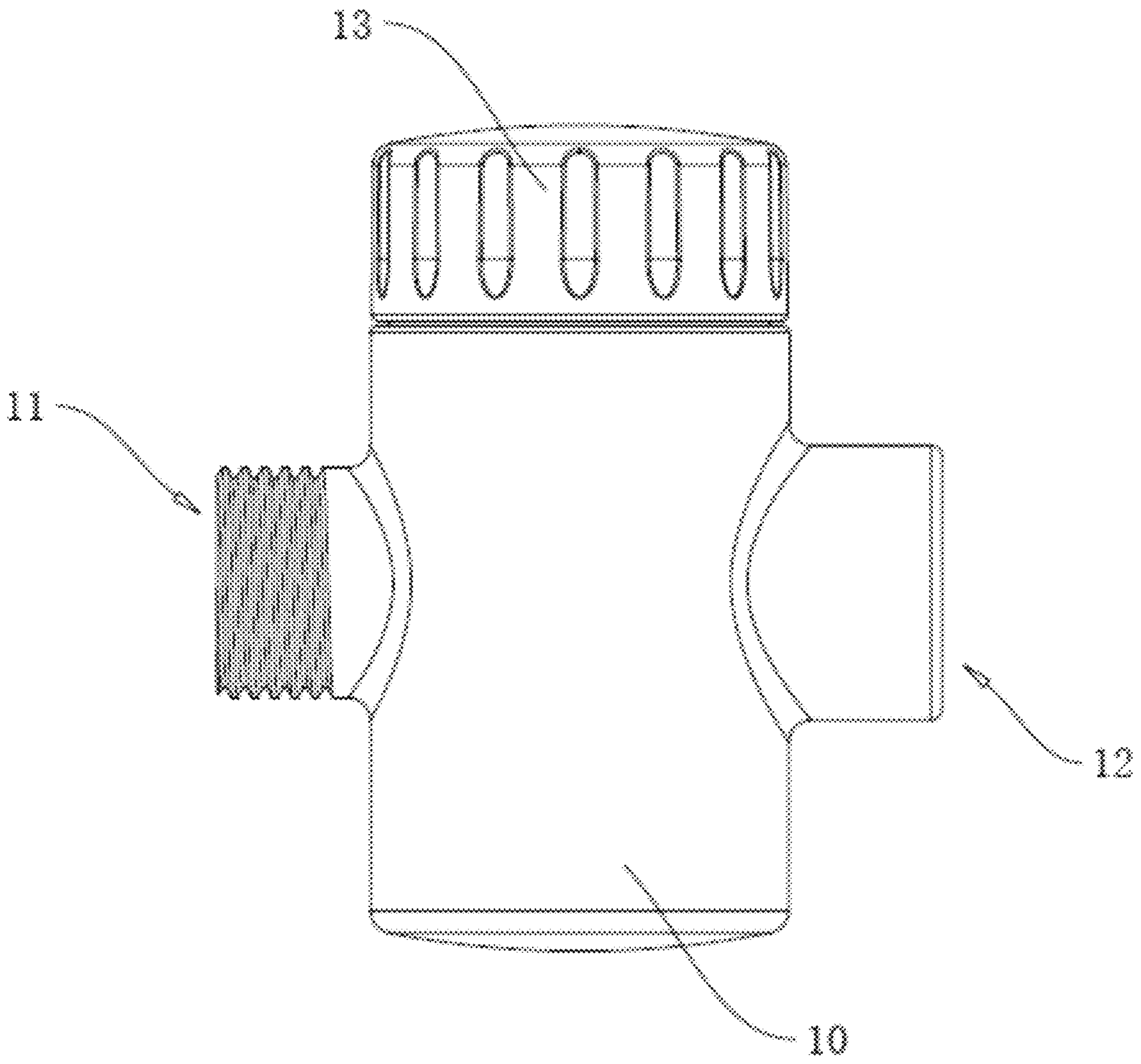
FIG. 1 is an overall structural schematic diagram of an embodiment of the present disclosure.

Reference numerals in the drawings: 10. Valve body; 11. Water inlet end; 12. Water outlet end; 13. Rotary knob; 14. Water inlet passageway; 20. Sliding seat; 21. Abutment end; 22. Restriction end; 30. Sliding spool; 31. Sealing end; 40. Thermal conductive element; 41. Mounting end; 42. Deformable element; 43. Assembly end; 50. First spring; 60. Second spring; 70. Adjustment rod; 71. Movable spacer; 72. Adjustment support portion; 80. Thermal actuator mounting seat; 81. Thermal actuator support portion; 82. Adjustment bore; 83. Stepped bore; 90. Reset spring; 100. Reset coil spring.

DETAILED DESCRIPTION OF THE EMBODIMENTS

To more clearly illustrate the objectives, technical solutions, and advantages of the embodiments of the present disclosure, the following provides a clear and comprehensive description of the technical solutions in conjunction with the accompanying drawings in the embodiments. It should be noted that the described embodiments are merely part of the implementations of the disclosure, rather than all possible embodiments. All other embodiments obtained by those skilled in the art based on the embodiments herein without creative efforts shall fall within the scope of protection of the disclosure. Therefore, the detailed description of the embodiments provided in the drawings is not intended to limit the claimed scope of the disclosure, but merely represents selected embodiments of the disclosure.

In the description of the present disclosure, the terms ‘first’ and ‘second’ are used solely for descriptive purposes and shall not be construed as indicating relative importance or implicitly specifying the quantity of the referenced technical features. Accordingly, features defined with ‘first’ or ‘second’ may explicitly or implicitly include one or more of such features. In the description, the term ‘plurality’ denotes two or more, unless explicitly and specifically defined otherwise.

As shown in FIG. 1, an anti-scald valve includes a valve body 10, which includes a water inlet end 11 and a water outlet end 12. The anti-scald valve further includes a sliding seat 20 disposed in the valve body 10, and a sliding spool 30 is slidably engaged in the sliding seat 20.

Figure 2:
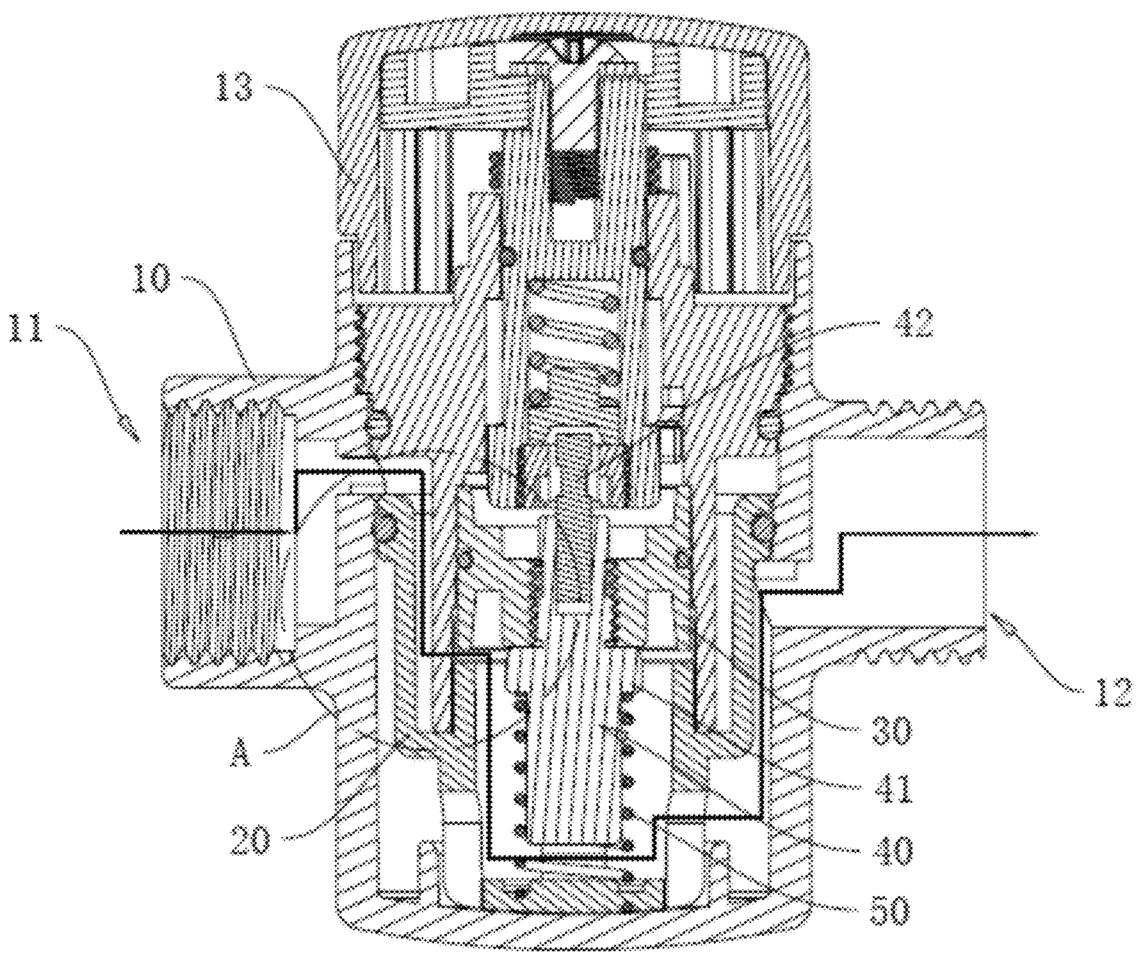
FIG. 2 is a cross-sectional schematic diagram of an anti-scald valve in a normal water temperature state according to the embodiment.
Figure 3:
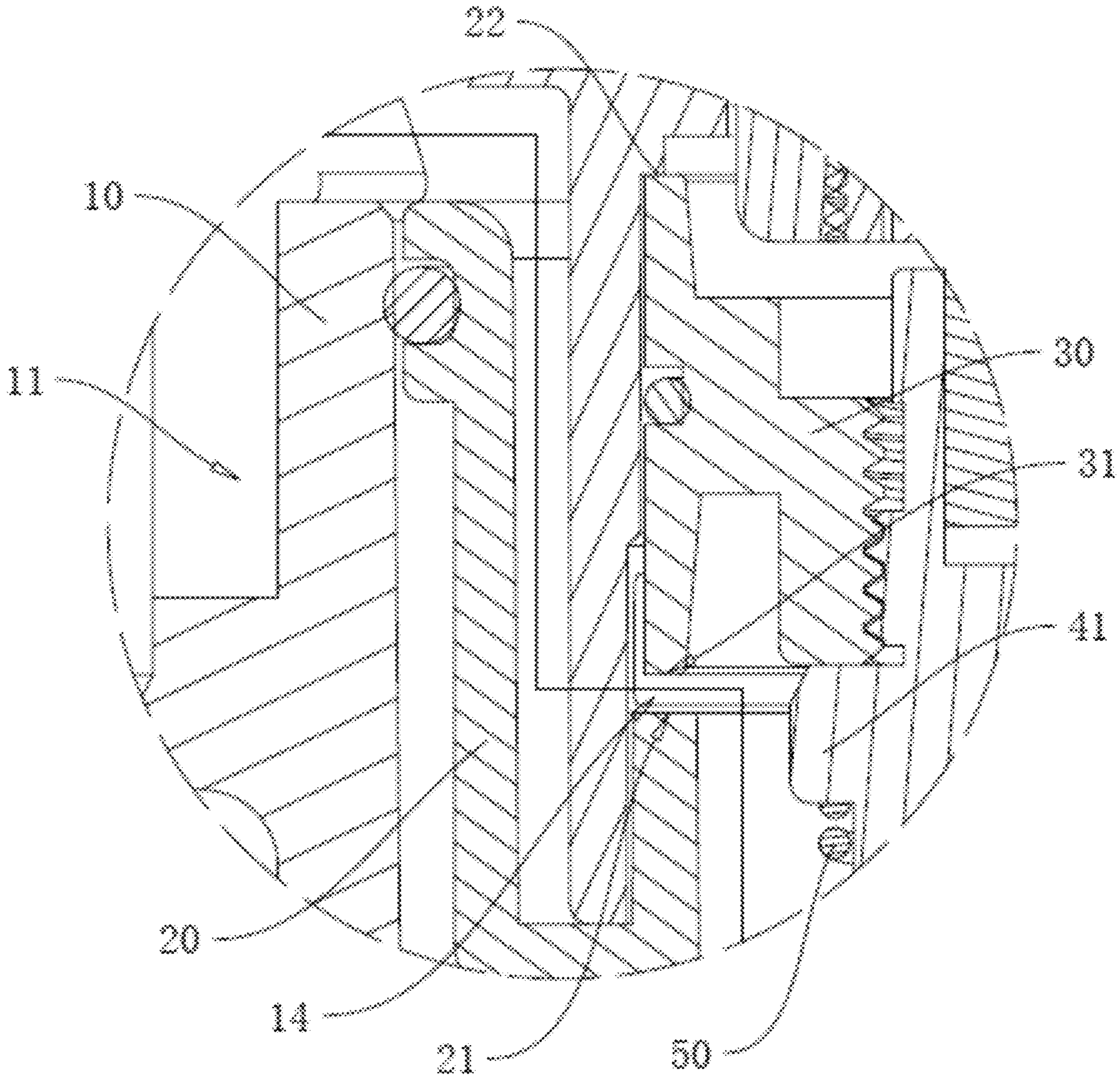
FIG. 3 is an enlarged schematic diagram of area A in FIG. 2 of the embodiment.

As shown in FIGS. 2 and 3, the sliding spool 30 has a sealing end 31, and the sliding seat 20 has an abutment end 21. When the sealing end 31 of the sliding spool 30 is separated from the abutment end 21 of the sliding seat 20, a water inlet passageway 14 is formed between the sealing end 31 and the abutment end 21. Conversely, when the sealing end 31 of the sliding spool 30 contacts the abutment end 21 of the sliding seat 20 (where the initial position is located), the water inlet passageway 14 is closed. Upon opening of the water inlet passageway 14, a fluid communication path is established among the water inlet end 11 of the valve body 10, the water inlet passageway 14, and the water outlet end 12 of the valve body 10, allowing liquid flow therethrough. It is to be noted that the arrow indicator in FIG. 2 denotes the flow path within the valve body.

As shown in FIGS. 2 and 3, the sliding seat 20 further includes a restriction end 22, a travel distance of the sliding spool 30 within the sliding seat 20 is between the restriction end 22 and the abutment end 21. The anti-scald valve additionally includes a thermal conductive element 40 and a first biasing member. The thermal conductive element 40 is fixedly connected to the sliding spool 30, while the first biasing member is positioned between the inner bottom wall of the valve body 10 and the thermal conductive element 40. Specifically, the first biasing member is configured as a first spring 50. The thermal conductive element 40 is provided with a mounting end 41, an end of the first spring 50 is fixedly connected to the mounting end 41 of the thermal conductive element 40, and the opposing end of the first spring 50 is fixedly connected to the inner bottom wall of the valve body 10.

When the liquid entering the water inlet end 11 of the valve body 10 is at a relatively low temperature (e.g., water temperature ≤38° C.), the thermal conductive element 40 is biased by the first spring 50 and hydraulic pressure to synchronously drive the sliding spool 30 toward a direction away from the inner bottom wall of the valve body 10. This movement continues until the sliding spool 30 abuts against the restriction end 22 of the sliding seat 20. At this state, the sealing end 31 of the sliding spool 30 is separated from the abutment end 21 of the sliding seat 20, thereby opening the water inlet passageway 14. This configuration allows low-temperature water flow to pass through the water inlet passageway 14 into the valve body 10.

Figure 4:
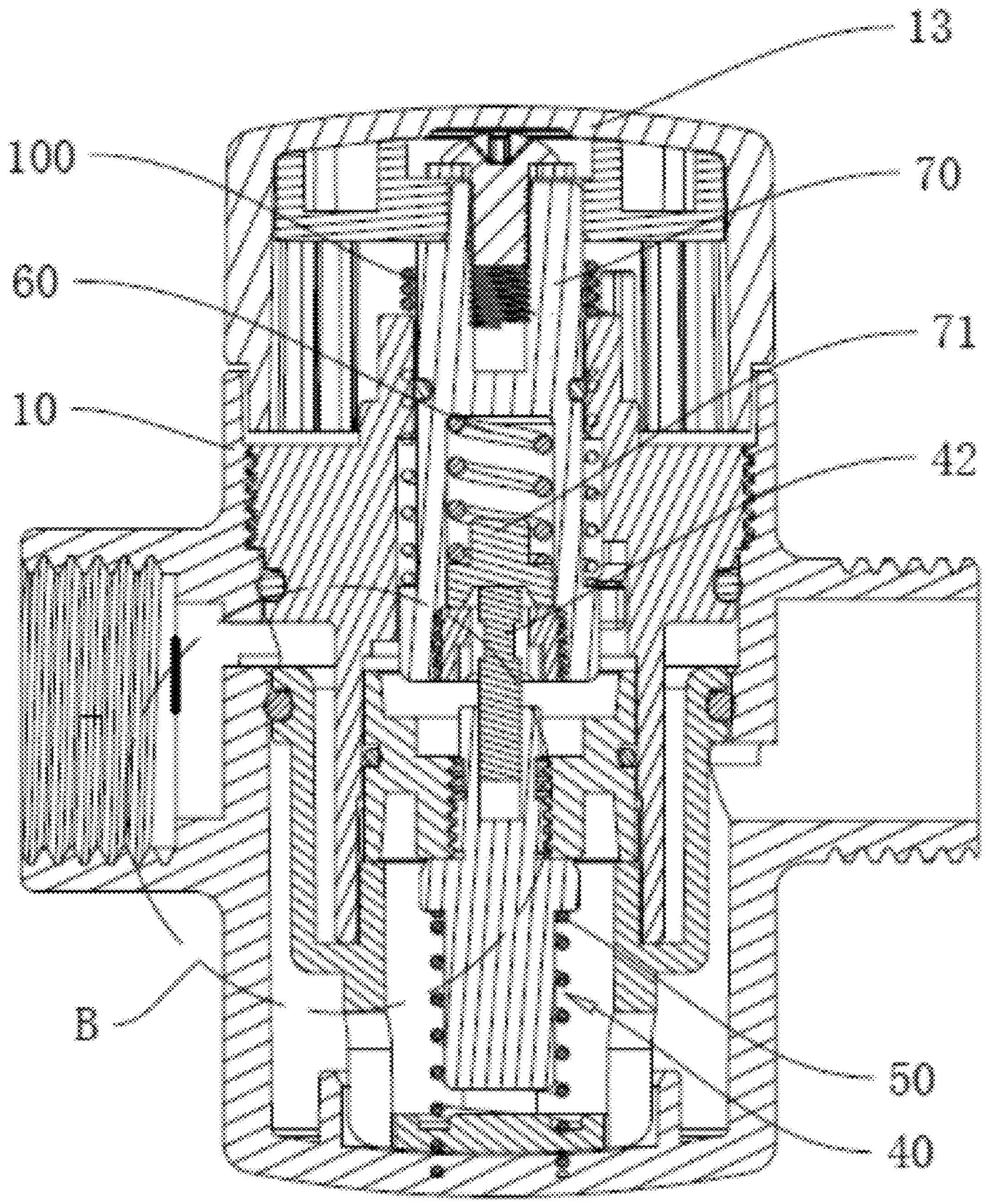
FIG. 4 is a cross-sectional schematic diagram of the anti-scald valve in a high-temperature water state according to the embodiment.
Figure 9:
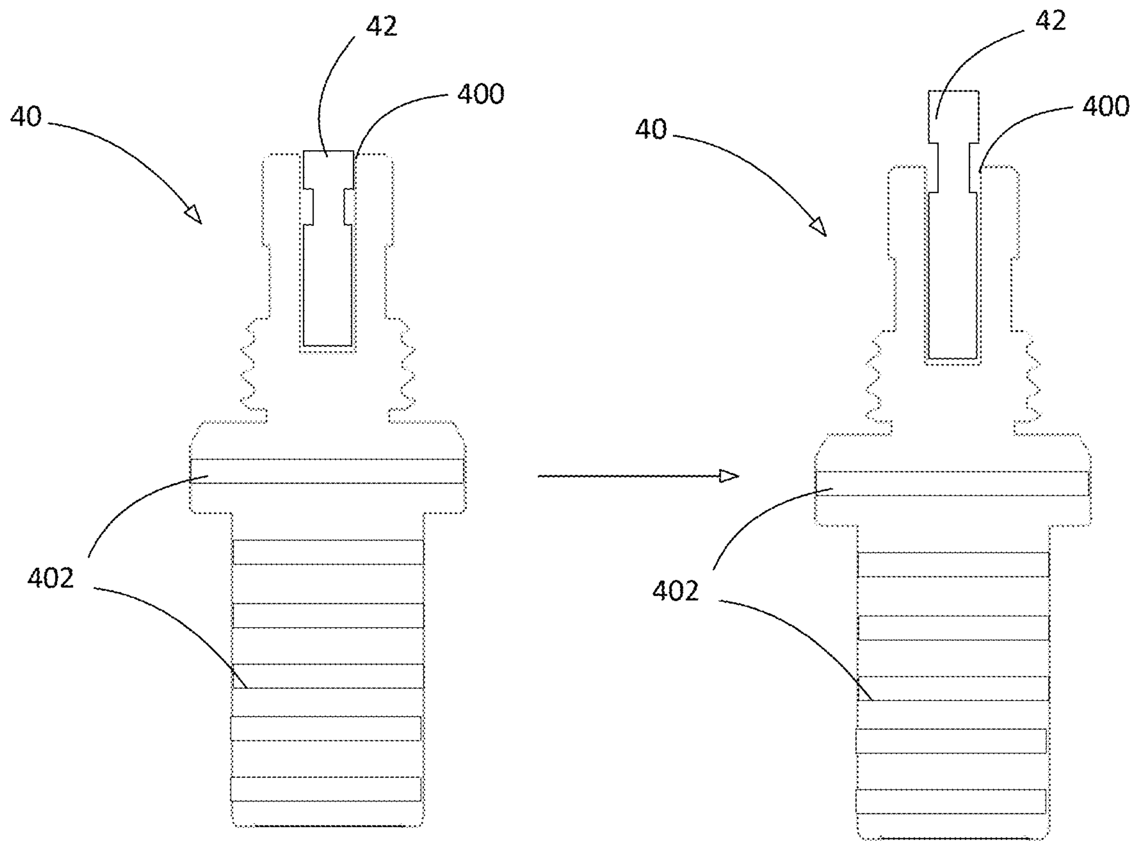
FIG. 9 is a cross-sectional schematic diagram of a thermal conductive element in one embodiment of the present disclosure.

As shown in FIG. 4, the thermal conductive element 40 is provided with a deformable element 42 at its end distal from the mounting end 41. In this embodiment, a paraffin thermal actuator is employed as the deformable element 42. When the temperature rises (e.g., water temperature raises to ≥49° C.), the paraffin thermal actuator expands in a direction away from the mounting end 41. Conversely, when the temperature decreases to ≤38° C., the paraffin thermal actuator contracts and returns to its original state. Referring to FIG. 9, in one embodiment, a first accommodation chamber 400 is formed at an end of the thermal conductive element 40 proximal to the deformable element 42, with at least a portion of the deformable element 42 being housed within the first accommodation chamber 400. Preferably, when the temperature decreases to less or equal to a first threshold (e.g., 38° C.), the paraffin thermal actuator retracts and returns to its original state and is fully housed within the first accommodation chamber 400. When the temperature raises, the paraffin thermal actuator expands toward a direction away from the mounting end 41 and its tip exposes from the first accommodation chamber 400. This configuration has the advantages of preventing damage to the deformable element 42 caused by installation misalignment and minimizing the volume of the overall structure.

Figure 10:
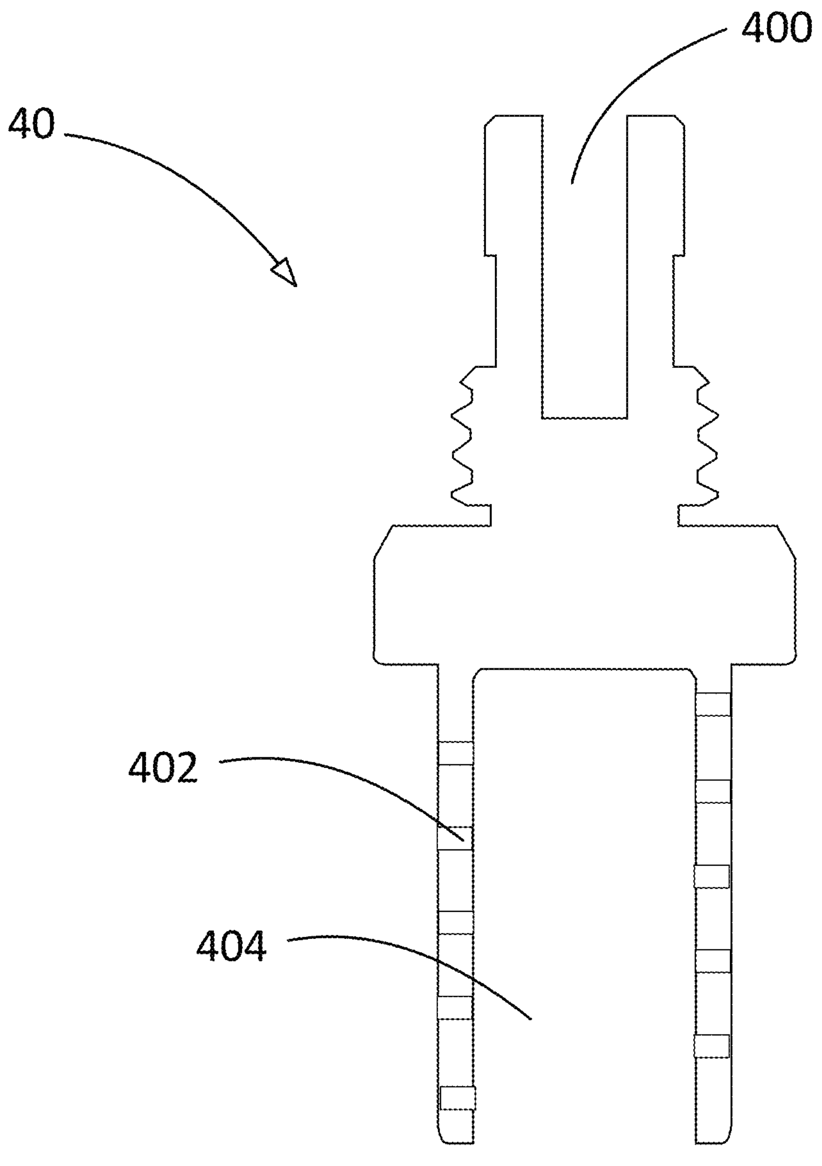
FIG. 10 is a cross-sectional schematic diagram of the thermal conductive element in another embodiment of the present disclosure.

As a further improvement, the thermal conductive element 40 is fabricated from a high-thermal-conductivity metallic material to enable rapid heat transfer to the deformable element 42. Referring additionally to FIG. 9, as a further improvement, in alternative embodiments, the thermal conductive element 40 may be provided with multiple flow channels 402 that are laterally arranged and oriented perpendicular to its movement direction to increase the contact area between the water flow and the thermal conductive element 40, thereby enhancing thermal exchange efficiency. As shown in FIG. 10, in other embodiments, a heat exchange chamber 404 may be provided at the end of the thermal conductive element 40 away from the deformable element 42, with the flow channels 402 interconnected to the heat exchange chamber 404, achieving rapid heat exchange. This configuration has the advantages of lowering the weight of the thermal conductive element 40, avoiding excessive load on the first spring 50 during forward installation and avoiding excessive load on the deformable element 42 during reverse installation, significantly improving valve responsiveness. Additionally, the rapid heat transfer can further improve the overall responsiveness.

As shown in FIG. 4, a top portion of the valve body 10 is provided with a rotary knob 13. A lower end of the rotary knob 13 is fixedly mounted with an adjustment rod 70 which extends into the interior of the valve body 10. The adjustment rod 70 is internally formed with a mounting cavity featuring an opening oriented toward the deformable element 42. Within the mounting cavity, a movable spacer 71 is slidably connected, configured to abut against the deformable element 42 that is thermally expanded.

As shown in FIG. 4, the valve body 10 further includes a second biasing member installed within the mounting cavity. Specifically, the second biasing member is configured as a second spring 60. One end of the second spring 60 is fixedly connected to the top inner wall surface of the mounting cavity, while the opposing end is fixedly connected to the movable spacer 71. It is to be noted that the elastic force of the second spring 60 exceeds the combined force of the first spring 50 and hydraulic pressure.

Figure 5:
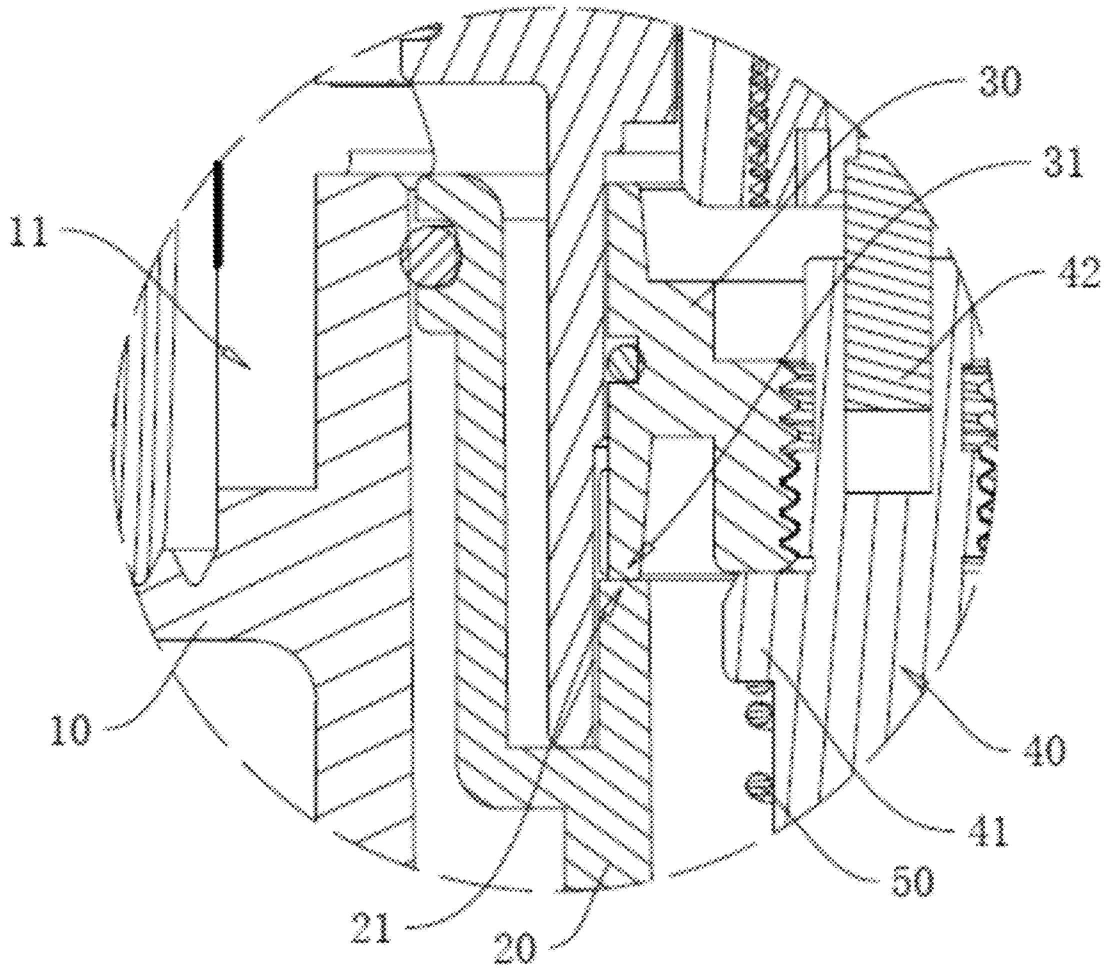
FIG. 5 is an enlarged schematic diagram of area B in FIG. 4 of the embodiment.

As illustrated in FIGS. 4 and 5, when the liquid entering the water inlet end 11 of the valve body 10 is at an elevated temperature (e.g., water temperature ≥49° C.), the deformable element 42 thermally expands toward a direction away from the mounting end 41. This expansion continues until the deformable element 42 extends into the mounting cavity and abuts against the movable spacer 71, forming a coupled interaction. As the deformable element 42 further elongates with increasing thrust force, the second spring 60 applies a counterforce to the thermal conductive element 40 to overcome the thrust generated by the first biasing member. Consequently, the thermal conductive element 40 drives the sliding spool 30 toward the inner bottom wall of the valve body 10. Since the elastic force of the second spring 60 exceeds the combined force of the first spring 50 and hydraulic pressure, the sealing end 31 of the sliding spool 30 abuts against the abutment end 21 of the sliding seat 20. This action seals the water inlet passageway 14, preventing high-temperature water from entering the valve body 10 through the water inlet passageway 14, thereby achieving anti-scalding protection.

It is noteworthy that as the temperature of heated water flowing into the valve body 10 continues to rise, the deformable element 42 progressively extends into the mounting cavity, actuating sliding movement of the movable spacer 71 over a corresponding distance. During this process, the second spring 60 provides a buffering effect to the movable spacer 71, establishing a non-rigid contact between the movable spacer 71 and the deformable element 42. This interaction prevents rigid mechanical contact between the thermally expanded deformable element 42 and the inner walls of the valve body 10, effectively mitigating risks of abrasive wear on the valve's inner wall, offering a valve body 10 protection effect under overheated situation.

Figure 6:
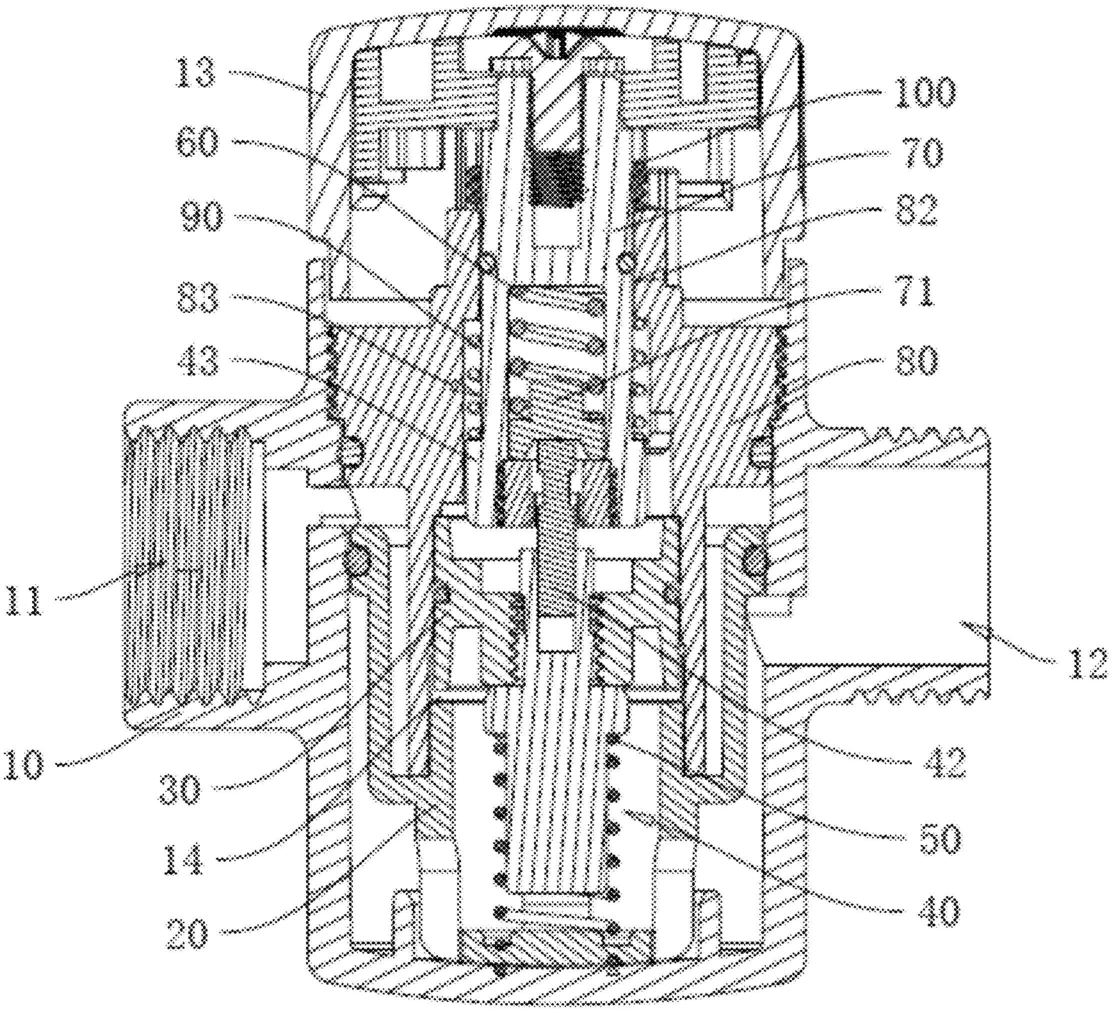
FIG. 6 is a cross-sectional schematic diagram of the anti-scald valve in a forced high-temperature water discharge state according to the embodiment.

As shown in FIG. 6, the valve body 10 is internally provided with a thermal actuator mounting seat 80, which is internally provided with an adjustment bore 82 for slidably engaging the adjustment rod 70. When high-temperature water is required to flow into the valve body 10, the adjustment rod 70 can be forced to move away from the thermal conductive element 40 under external force application. The relative displacement between the adjustment rod 70 and the thermal actuator mounting seat 80 exceeds the maximum stroke of the movable spacer 71 within the sliding rod. Consequently, the second biasing member is separated from the coupling end of the deformable element 42 under external force. The second spring 60 loses its ability to exert downward thrust on the deformable element 42 via the movable spacer 71 and thus failing to push the sliding spool 30 to move downward. In this state, under the action of the first spring 50, the thermal conductive element 40 drives the sliding spool 30 to move upward in a direction away from the inner bottom wall of the valve body 10. This action opens the water inlet passageway 14.

As shown in FIG. 6, after completing the use of high-temperature water, the adjustment rod 70 can be slid downward within the thermal actuator mounting seat 80 to its original position, thereby restoring normal operation of the valve body 10. To facilitate resetting of the adjustment rod 70, a reset member may be provided between the adjustment rod 70 and thermal actuator mounting seat 80. Specifically, the reset member may be configured as a reset spring 90.

Specifically, as shown in FIG. 6, the thermal actuator mounting seat 80 is provided with a stepped bore 83 communicating with the adjustment bore 82. The diameter of the stepped bore 83 exceeds that of the adjustment bore 82, thereby creating a stepped interface by the two. One end of the adjustment rod 70 away from the rotary knob 13 protrudes outward to from an assembly end 43. One end of the reset spring 90 is fixedly connected to the stepped interface, while the opposing end of the reset spring 90 is fixedly connected to the assembly end 43. When the adjustment rod 70 is forcibly moved upward within the thermal actuator mounting seat 80, the reset spring 90 undergoes compression. Upon removal of the upward tensile force, the reset spring 90 releases stored elastic energy, driving the adjustment rod 70 downward to return to its original position.

Figure 7:
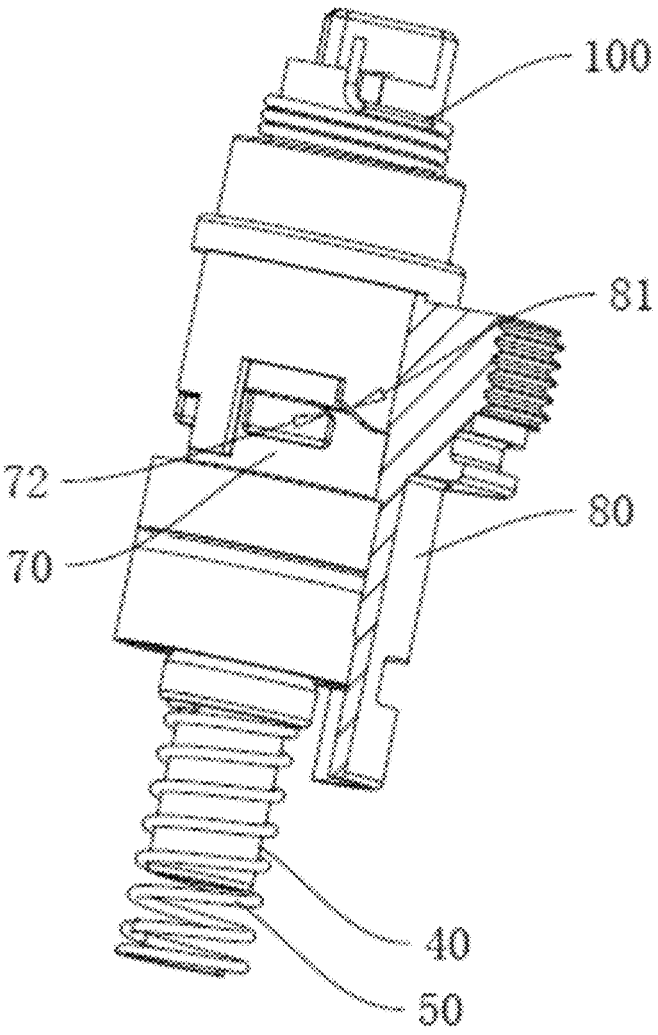
FIG. 7 is a cross-sectional schematic diagram illustrating the adjustment support portion and the thermal actuator support portion of the embodiment.

It should be noted that, as shown in FIG. 7, the adjustment rod 70 is peripherally provided with an inclined adjustment support portion 72, while the inner circumferential wall of the thermal actuator mounting seat 80 is provided with an inclined thermal actuator support portion 81. When the inclined adjustment support portion 72 and inclined thermal actuator support portion 81 are in mating engagement, the adjustment rod 70 resides in its initial position, and at this state, the adjustment rod 70 is restricted to slide upward relative to the thermal actuator mounting seat 80.

Figure 8:
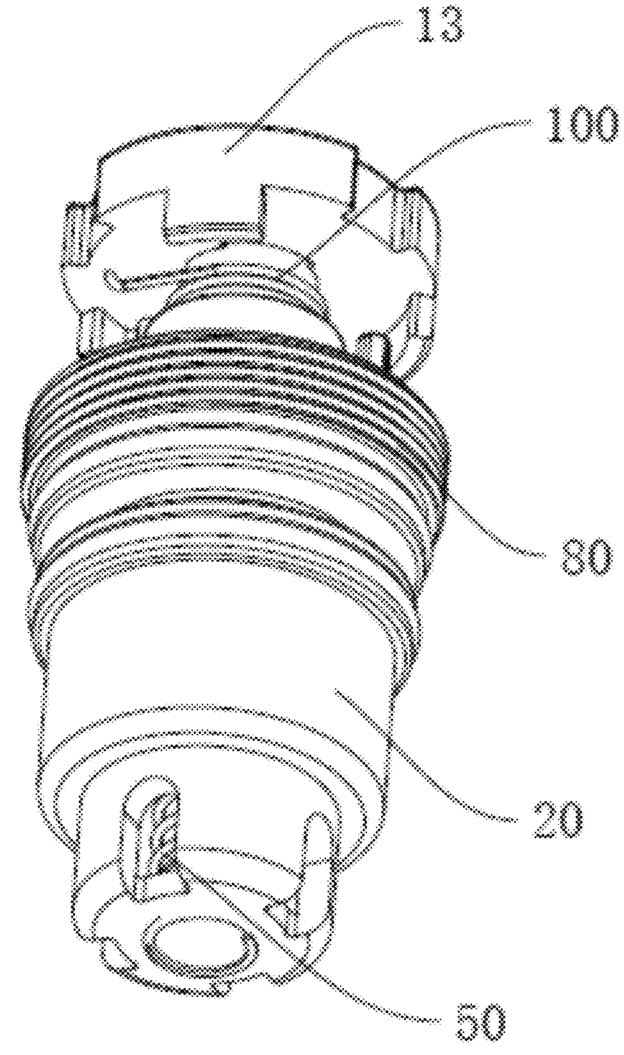
FIG. 8 is a structural schematic diagram showing a reset coil spring of the embodiment.

As shown in FIG. 8, to minimize the impact of the high-temperature hot water discharge function of the valve body 10 on its anti-scalding performance, a reset coil spring 100 is installed between the rotary knob 13 and the thermal actuator mounting seat 80. One mounting end 41 of the reset coil spring 100 is fixedly connected to the base of the rotary knob 13, while the opposing mounting end 41 is fixedly connected to the top of the thermal actuator mounting seat 80.

Furthermore, as shown in FIGS. 7 and 8, the adjustment rod 70 is capable of rotating about its own axis within the thermal actuator mounting seat 80. In the natural state, the adjustment support portion 72 is in mating engagement with the thermal actuator mounting seat 81. Since the adjustment rod 70 is fixedly connected to the lower end of the rotary knob 13, the adjustment rod 70 cannot rotate relative to the thermal actuator mounting seat 80 under the action of the reset coil spring 100.

When high-temperature hot water supply is required, apply a torsional force to the rotary knob 13 sufficient to overcome the elastic force of the reset coil spring 100. This action induces a counterclockwise rotation of the adjustment rod 70 from a top view perspective, causing the adjustment support portion 72 to separate from the thermal actuator support portion 81. Subsequently, the adjustment rod 70 can be moved upward relative to the thermal actuator mounting seat 80 to open the water inlet passageway 14. Upon completion of usage, the torsional force applied to the rotary knob 13 is released. Under the combined action of the reset coil spring 100 and the reset spring 90, the adjustment rod 70 automatically returns to its initial position.

During normal operation of the anti-scalding function, the adjustment rod 70 remains stationary relative to the thermal actuator mounting seat 80 under the action of the reset coil spring 100 (i.e., the adjustment rod 70 is not only unable to rotate relative to the thermal actuator mounting seat 80 and but also unable to slide relative to the thermal actuator mounting seat 80). This ensures that the high-temperature hot water discharge function does not interfere with the proper operation of the anti-scalding mechanism.

The foregoing descriptions merely represent preferred embodiments of the present disclosure and are not intended to limit the scope of the present disclosure. To those skilled in the art, the application may be subject to various modifications and variations. Any modification, equivalent substitution, or improvement made within the spirit and principles of the present disclosure shall fall within the protection scope thereof.

What is claimed is:

1. An anti-scald valve, comprising: a valve body having a water inlet end and a water outlet end both communicating with an interior of the valve body;

wherein the anti-scald valve further comprises:

a sliding seat disposed in the interior of the valve body, wherein the sliding seat has an abutment end;

a sliding spool slidably mounted in the sliding seat, wherein the sliding spool has a sealing end, when the sealing end is separated from the abutment end, a water inlet passageway is defined between the sealing end and the abutment end, and when the sealing end contacts the abutment end, the water inlet passageway is closed;

a thermal conductive element, wherein an end of the thermal conductive element is fixedly connected to the sliding spool, and the thermal conductive element has a deformable element that is thermally expandable;

a first biasing member configured to apply a thrust force to the thermal conductive element at low temperatures, thereby driving the sliding spool to slide to an initial position where the sealing end is separated from the abutment end, so as to open the water inlet passageway;

a second biasing member disposed in the valve body, wherein when high-temperature water flows into the valve body, heat transferred from the thermal conductive element to the deformable element, causing thermal expansion of the deformable element, thus coupling with an end of the second biasing member; the coupling enables the second biasing member to exert a counterforce on the thermal conductive element and the counterforce overcomes the thrust force of the first biasing member, thereby driving the sliding spool to slide to a position where the sealing end contacts the abutment end, so as to close the water inlet passageway;

wherein, when high-temperature water supply is required, the second biasing member is separable from a coupling end of the deformable element under external force application to remove the counterforce applied on the thermal conductive element by the second biasing member, allowing the first biasing member to drive the sliding spool to slide to the initial position where the sealing end is separated from the abutment end, so as to open the water inlet passageway for high-temperature water intake.

2. The anti-scald valve according to claim 1, wherein the first biasing member is a first spring, an end of the first spring is fixedly connected to an inner bottom wall of the valve body, and an opposing end of the first spring is fixedly connected to the thermal conductive element.

3. The anti-scald valve according to claim 1, wherein the valve body is slidably mounted with an adjustment rod, the adjustment rod is internally provided with a mounting cavity for accommodating the second biasing member, a movable spacer is slidably connected within the mounting cavity, an end of the second biasing member is fixedly connected to an inner top wall surface of the mounting cavity, and an opposing end of the second biasing member is fixedly connected to the movable spacer, when the deformable element is thermally expanded and extends into the mounting cavity, the deformable element is coupled with the movable spacer.

4. The anti-scald valve according to claim 3, wherein the second biasing member is a second spring, a spring force of the second spring is greater than the sum of a thrust generated by the first biasing member and a hydraulic pressure.

5. The anti-scald valve according to claim 4, wherein the valve body is internally provided with an apertured connector, the adjustment rod is slidably connected within the apertured connector, a reset member is disposed inside the apertured connector to drive the adjustment rod to synchronously actuate the second spring to slide toward the thermal conductive element until the initial position is reached.

6. The anti-scald valve according to claim 5, wherein the apertured connector comprises an adjustment bore and a stepped bore communicating with the adjustment bore, the adjustment rod is slidably connected within the adjustment bore, and a stepped interface is formed between the adjustment bore and the stepped bore; the reset member is configured as a reset spring, wherein an end of the reset spring is fixedly connected to the stepped interface, while an opposing end of the reset spring is fixedly connected to the adjustment rod at an end proximal to the thermal conductive element.

7. The anti-scald valve according to claim 6, wherein the valve body is internally provided with a thermal actuator support portion, and the adjustment rod is peripherally formed with an adjustment support portion, when the thermal actuator support portion and the adjustment support portion are in a mating engagement, the second spring is located in its initial position.

8. The anti-scald valve according to claim 7, wherein the adjustment rod is capable of rotating about its own axis within the adjustment bore, thereby causing the thermal actuator support portion to separate from the adjustment support portion, a reset coil spring is disposed between the adjustment rod and the valve body, the reset coil spring is configured to drive the thermal actuator support portion to tightly abut against the adjustment support portion.

9. The anti-scald valve according to claim 1, wherein a first accommodation chamber is disposed at an end of the thermal conductive element proximal to the deformable element, wherein the deformable element is at least partially housed within the first accommodation chamber.

10. The anti-scald valve according to claim 9, wherein the deformable element is a paraffin thermal actuator.

11. The anti-scald valve according to claim 9, wherein when water temperature decreases to less or equal to a first threshold, the paraffin thermal actuator retracts to be fully housed within the first accommodation chamber; when the water temperature raises to higher than the first threshold, the paraffin thermal actuator expands toward a direction away from a mounting end and its tip exposes from the first accommodation chamber to couple with an end of the second biasing member.

12. The anti-scald valve according to claim 9, wherein the thermal conductive element is provided with a plurality of flow channels to increase contact area between the water flow and the thermal conductive element.

13. The anti-scald valve according to claim 12, wherein a heat exchange chamber is provided at an end of the thermal conductive element distal from the deformable element, and the flow channels are in communication with the heat exchange chamber.

* * * * *